United States Patent

Lanciaux

[11] Patent Number: 5,905,464
[45] Date of Patent: May 18, 1999

[54] PERSONAL DIRECTION-FINDING APPARATUS

[75] Inventor: Jacques Lanciaux, Pibrac, France

[73] Assignee: Rockwell-Collins France, Blagnac, France

[21] Appl. No.: 08/894,906

[22] PCT Filed: Mar. 5, 1996

[86] PCT No.: PCT/FR96/00344

§ 371 Date: Sep. 3, 1997

§ 102(e) Date: Sep. 3, 1997

[87] PCT Pub. No.: WO96/27804

PCT Pub. Date: Sep. 12, 1996

[30] Foreign Application Priority Data

Mar. 6, 1995 [FR] France .................................. 95 02591

[51] Int. Cl.$^6$ .............................. G01S 5/04; G01C 21/00; H04R 5/00
[52] U.S. Cl. .............................. 342/443; 340/979; 381/25
[58] Field of Search .................................. 342/442, 443, 342/424, 419; 348/116; 340/979, 952; 381/25

[56] References Cited

U.S. PATENT DOCUMENTS

| | | | |
|---|---|---|---|
| 3,626,416 | 12/1971 | Rabow | 342/419 |
| 4,449,018 | 5/1984 | Stanton . | |
| 4,713,669 | 12/1987 | Shuch | 342/455 |
| 4,774,515 | 9/1988 | Gehring . | |
| 4,817,149 | 3/1989 | Myers | 381/1 |
| 5,068,832 | 11/1991 | Kirkpatrick . | |
| 5,438,623 | 8/1995 | Begault | 381/17 |
| 5,495,534 | 2/1996 | Inanaga et al. | 381/25 |
| 5,508,699 | 4/1996 | Silverman | 340/944 |

FOREIGN PATENT DOCUMENTS

| | | |
|---|---|---|
| 266 250 | 5/1988 | European Pat. Off. . |
| 378 339 | 7/1990 | European Pat. Off. . |
| 629 832 | 12/1994 | European Pat. Off. . |

*Primary Examiner*—Gregory C. Issing
*Attorney, Agent, or Firm*—Young & Thompson

[57] ABSTRACT

A personal direction finding apparatus for sensing electromagnetic, infrared or ultrasound radiation from a source (S) to determine the direction of the source or generate a virtual sound environment. The apparatus is characterized in that it comprises a radiation sensing device (1) worn on the user's head (2) for generating a signal having a variable characteristic depending on the direction (R) of the source (S) relative to the sensing device (1), i.e. the position of the user's head, a receiver (4) optionally provided as a demodulator, a direction signal processing circuit (5) outputting a control signal (x) indicating the angular deviation (a) between the direction of the source (S) and the current position of the sensing device (1), i.e. the user's viewing axis, and two earphones (3d, 3g) placed over the user's ears and connected to the output of the processing circuit (5).

4 Claims, 3 Drawing Sheets

PERSONAL DIRECTION-FINDING APPARATUS

FIELD OF THE INVENTION

The present invention relates to a personal direction-finding apparatus that may be used for detecting an electromagnetic, infrared or ultrasound radiation emitted from a source, with a view to determining the direction of this source or creating a virtual sound environment.

BACKGROUND OF THE INVENTION

Direction-finding makes it possible to determine the direction of a source of radiation. Conventional applications are manual direction-finding and automatic direction-finding.

Automatic direction-finding is largely used on fixed installations or on mobile ones (aeroplanes, boat, vehicle). The indication of direction is available in the form of a bearing (angle between the wearer and the apparent direction) or an indication of deviation of right/left type.

Manual direction-finding is often used for seeking the source of emission with the aid of an antenna or a sensor oriented by hand. This type of direction-finder rests on the search for minimum or maximum reception without delivering the information of relative position of the direction of the source with respect to the scanning sensor or antenna.

The two types of direction-finding require the reading of an instrument often associated with listening in on a receiver or loud-speaker to allow the source to be identified. Manual direction-finding does not allow a free-hand search of the source of radiation.

As described in U.S. Pat. No. 5,068,832, a personal direction-finding apparatus for detecting an ultrasound radiation and locating the direction of the source emitting this radiation, is already known. This apparatus comprises a local oscillator for converting the inaudible frequencies of the ultrasound signal into frequencies included in the range of audible sounds.

U.S. Pat. No. 4,774,515 discloses an apparatus for indicating normal attitude to give an indication of a normal attitude to an individual jointly with a means for producing a signal representing the attitude in real time of the indiviual in space and a means for placing, in three-dimensional space, the normal indication relative to the individual in response to the signal in real time representing the attitude in real time, so as to give the individual a normal indication relative to the attitude in real time of the individual in space.

SUMMARY OF THE INVENTION

The present invention aims at overcoming these drawbacks by providing a direction-finding apparatus of particularly simple design, portable, leaving the user's hands free, and not requiring reading of an instrument.

To that end, this personal direction-finding apparatus which may be used for detecting an electromagnetic, infrared or ultrasound radiation emitted from a source, with a view to determining the direction of this source or creating a virtual sound environment, comprising a radiation sensing means worn on the user's head, adapted to be oriented with respect to the source by a movement of rotation of the head and producing a signal having a variable characteristic depending on the direction of the source with respect to the sensing means, i.e. to the position of the head, and two earphones placed respectively over the user's two ears, to emit a sound signal whose nature depends on the angular deviation between the direction of the source and the current position of his head, is characterized in that it further comprises a receiver, intervening as demodulator, whose input is connected to the sensing means and a circuit for processing the demodulated signal at the output of the demodulator outputting a control signal as a function of the angular deviation between the direction of the source and the current position of the sensing means, i.e. the user's viewing axis, and two audio signal processing circuits, respectively allocated to the right and left phonic voices, of which the inputs are connected to the output of the processing circuit and the outputs are connected respectively to the two right and left earphones, to allow the direction of the source to be perceived by binaural listening.

The direction-finding apparatus according to the present invention may advantageously be in the form of a headphone incorporating earphones, in which an antenna or sensor system constituting the radiation sensing means is incorporated. All the other elements of the electronic circuit for processing the signal picked up may also be integrated in the headphone or they may be worn at any point of the user's body, being connected to the headphone by wires.

The direction-finding apparatus according to the present invention may advantageously be used in numerous applications with a view to determining the direction of a source of radiation. By way of examples of applications, the following may be mentioned: location of distress markers on land and beneath snow (detection of people caught beneath an avalanche), rendezvous over a zone marked by an emitter, communication with location in individual aeronautic activities employing parachutes, parapentes, hand-gliders, microlites, location and identification of electromagnetic disturbers, safety and communication of personnel equipped with a helmet or pressure suit and working under severe conditions in the environment or in hostile environments. In the latter case, the system of reception used for direction-finding is completed by an emitter in order to allow a bilateral link with a reciprocal location. This latter apparatus may thus be advantageously used by firemen intervening in a dangerous, low-visibility zone, by personnel working in polluted, noisy, radioactive zone, by astronauts outside their vehicle, by underwater divers (transmission by modulation of an ultrasonic wave), etc.

As indicated hereinabove, the direction-finding apparatus according to the present invention may also advantageously be used for simulating a sound environment in a virtual interactive environment (training on simulator or game).

BRIEF DESCRIPTION OF THE DRAWINGS

Various forms of embodiment of the present invention will be described hereinafter by way of non-limiting examples, with reference to the accompanying drawings, in which.

DETAILED DESCRIPTION OF THE INVENTION

Figure 1:
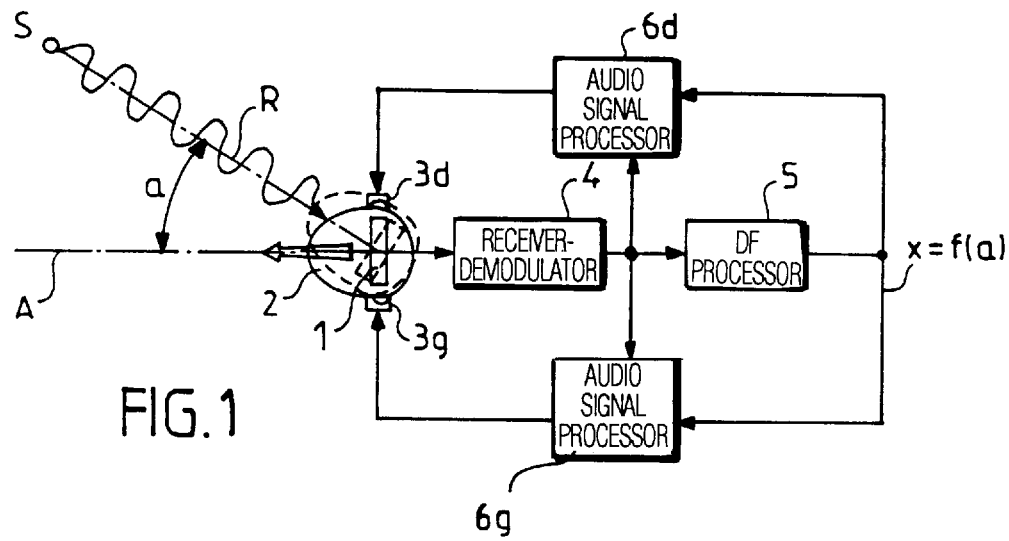
FIG. 1 is a block diagram of a direction-finding apparatus according to the present invention allowing the direction of a source of radiation to be located by means of binaural listening.

Referring now to FIG. 1, it is seen to represent a block diagram of a direction-finding apparatus according to the present invention, which may be used for sensing an electromagnetic radiation emitted by a source S. In the following description, all the examples of applications of the apparatus according to the invention which will be described will concern the sensing of an electromagnetic radiation, but it goes without saying that the apparatus according to the present invention may also be used for sensing other radiations, such as infrared and ultrasound radiations, using appropriate sensors.

The direction-finding apparatus according to the present invention comprises a means 1 for sensing the electromagnetic radiation emitted by the source S, in the present case an antenna system disposed transversely on the apparatus user's head 2, i.e. parallel to the axis of his ears. In addtion, the direction-finding apparatus uses two right (3d) and left (3g) earphones to produce sound signals applied respectively to the user's right and left ears.

The antenna system 1 is connected to a receiver 4 which receives the signal picked up by the antenna, which is a function of the angular deviation a between the direction R of the source S of the electromagnetic radiation and the direction of observation A of the apparatus user, the direction of observation of the apparatus user being indicated by a black arrow in each of the Figures of the drawings.

The receiver 4 delivers at its output a direction-finding signal which is applied to the input of a circuit 5 for processing the direction-finding signal delivering at its output a signal x which is a function of the angular deviation a. In other words, one has x=f(a). The output of the circuit 5 is connected to the inputs of two audio signal processing circuits 6d, 6g, respectively allocated to the right and left phonic voices and whose outputs are respectively connected to the right (3d) and left (3g) earphones.

The direction-finding apparatus according to the present invention enables the user thereof to locate the source S of an electromagnetic radiation, keeping his hands free and without requiring particular attention for his part, for example without having to read a position indicator. In the case of the binaural listening system shown in FIG. 1, the characteristics of the signals applied on the earphones 3d, 3g allow, for the wearer of these earphones, a restitution of the sound environment similar to that of a person to whom he is directly speaking placed in the same direction with respect to the orientation of the head. No particular instruction is necessary for using the apparatus and the natural reflexes allow the source S to be located with the desired precision. A rough location of the source S is obtained without moving the head, simply from the difference of the signals applied to the two right (3d) and left (3g) earphones. A slight movement of pivoting of the head is sufficient to lift the ambiguity of a source placed in front or behind the user. In fact, if the source S is placed in the axis of the user's head and in front, a pivoting of the head in clockwise direction is translated, for the user of the apparatus, in a relative displacement of the source S towards his left. On the other hand, if the source S is located behind the user, the same pivoting movement of the head is translated by a relative displacement of the source S towards the right. Finally, if the user desires a precise location of the source S, he naturally turns his head in the apparent direction of the sound source reconstituted by means of the two earphones 3d, 3g.

The antenna system 1 and the earphones 3d, 3g may serve solely for direction-finding or they may also be used for a communication between several persons.

Figure 7:
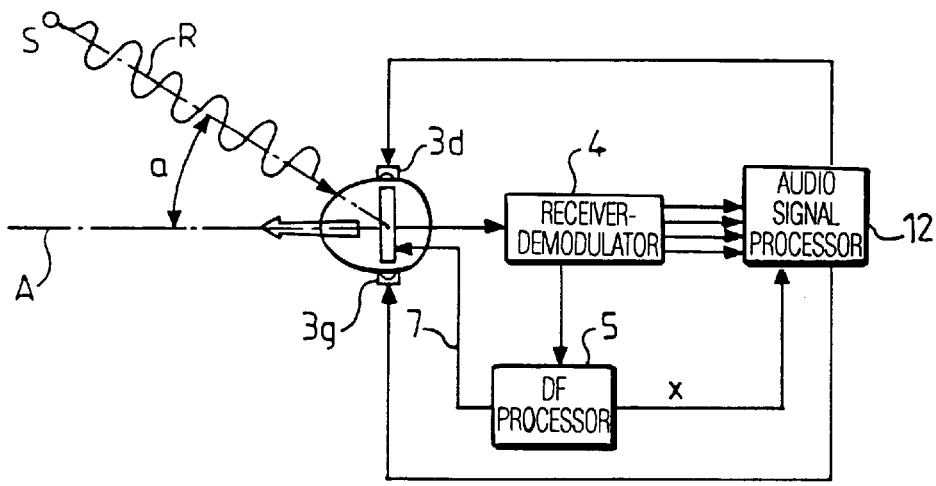
FIG. 7 is a block diagram of a variant of the apparatus applied to the simulation of a sound environment.

As has been described hereinabove, the apparatus according to the present invention may use an antenna system 1 with one sole analysis axis parallel to the transverse axis of the ears. However, it is possible to envisage a more elaborate form of embodiment using at least two non-parallel analysis axes to allow a more realistic restitution of the relative position of the user's head with respect to the emission source S. An antenna system with a plurality of analysis axes corresponds to the application, described hereinafter, to the creation of a virtual interactive sound environment (FIG. 7). The origin of the radiation may be analyzed by any known means and to that end any conventional method of analysis may be used in direction-finding systems delivering information of deviation or angular difference.

The apparatus comprises a headphone supporting the antenna (1) or sensor system as well as the earphones 3d, 3g and possibly the other components 4,5,6d, 6g of the electric circuit, in other words the headphone may comprise only the antenna system 1 and the earphones 3d, 3g, the other elements of the electric circuit being carried on the user's body, on his belt or on his back.

Figure 2:
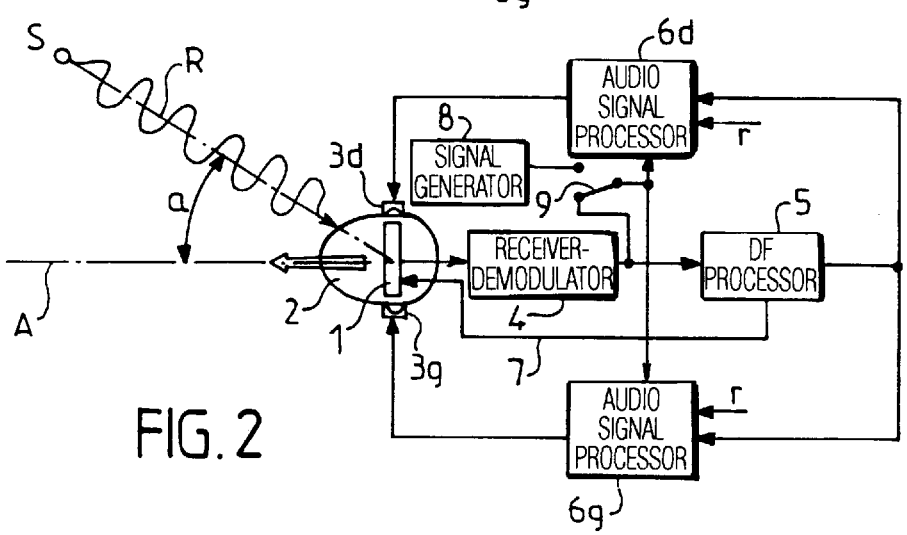
FIG. 2 is a block diagram of an embodiment of a direction-finding apparatus allowing the direction of a source of radiation, modulated or non-modulated, to be located by means of binaural listening.

FIG. 2 shows a form of embodiment of the direction-finding apparatus using an amplitude, phase or frequency modulation of the signal picked up by the antenna system. If the carrier wave of the electromagnetic radiation coming from source S is modulated, the signal processing circuit 5 which is connected to the antenna system 1 via a link 7, applies to this antenna system a modulating signal which produces the modulation of the picked up signal. The antenna system 1 therefore delivers a double-modulation antenna signal to the receiver 4 also intervening as demodulator. This receiver 4 thus delivers at its output two superposed demodulated low-frequency signals, namely one coming from the modulation of the source and the other from the modulation by the antenna system 1 and these two signals are applied to the two audio signal processing circuits 6d and 6g and to the direction-finding signal processing circuit 5. Furthermore, the direction-finding signal processing circuit 5 delivers at its output the signal x which is a function of the angular deviation and which is applied to the two circuits 6d, 6g. The two audio signal processing circuits 6d, 6g apply to the respective earphones 3d and 3g signals which are different as a function of the angular deviation a.

The functions performed by units 5, 6d, 6g and 8 of FIG. 2 may be ensured by software employed by a DSP (Digital Signal Processor), equipment of small dimensions and low energy consumption. The software itself will be schematically described hereinafter with reference to FIG. 8.

Figure 3A:
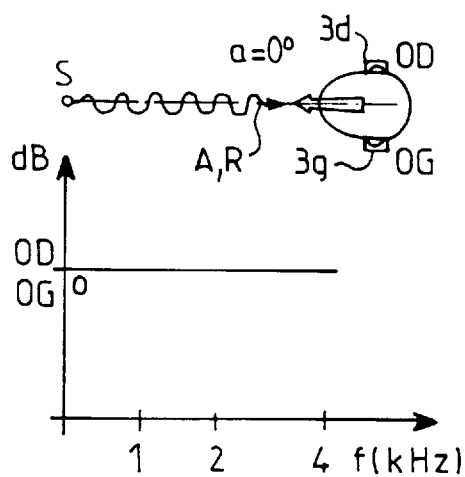
FIGS. 3A and 3B are diagrams respectively illustrating the amplitudes of the sound signals produced in the right and left ears, respectively in the case of orientation of the head in the direction of the source of radiation and of its orientation after a rotation through 90°.
Figure 3B:
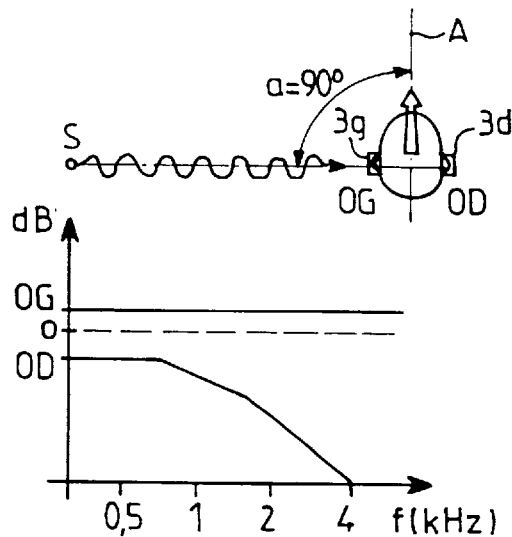

FIGS. 3A and 3B represent the levels of the sound signals applied to the user's right ear OD and left ear OG for the two extreme values of the angular deviation of the user's head with respect to the source S, namely a position with zero angular deviation (FIG. 3A) and a position with angular deviation of 90° (FIG. 3B). It is seen that, when the axis of observation A is merged with the direction R of the source of radiation S, i.e. for a zero angular deviation, the sound signals applied to the two ears have the same amplitude, this amplitude being called "reference level". On the other hand, when the head rotates through 90° in clockwise direction, as shown in FIG. 3B, the ear exposed to the radiation, i.e. the left ear OG in the case illustrated, receives a sound signal whose level is higher than the reference level, while the opposite ear, i.e. the right ear OD, receives a sound signal whose amplitude is less than the reference level and decreases with the frequency of the radiation.

Figure 4:
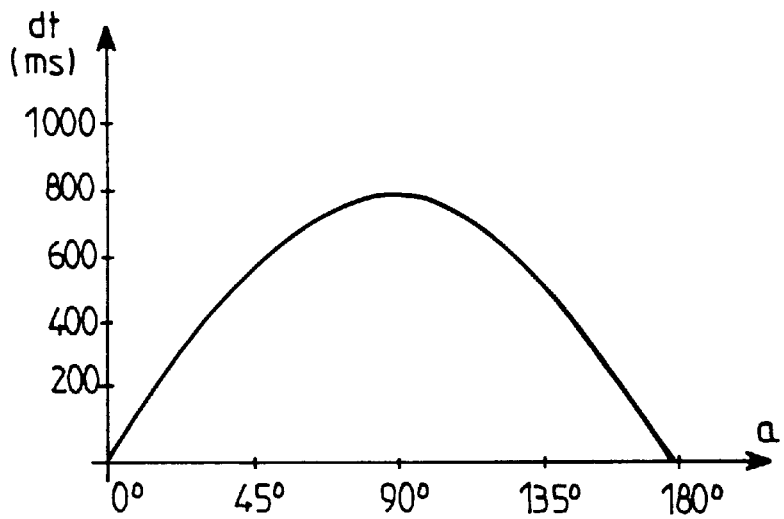
FIG. 4 is a diagram illustrating the variation of the delay between the signals applied to the left and right earphones as a function of the angular deviation between the user's head and the direction of the source.

FIG. 4 illustrates the variation of the delay dt of the signal applied to the ear opposite the source, i.e. the right ear OD in FIG. 3, with respect to the signal applied to the exposed ear, i.e. the left ear OG. It is seen that this delay dt, expressed in microseconds, is maximum for an angular deviation a of 90° and that it is zero for a deviation of 0° or 180°, i.e. when the transverse axis of the ears is perpendicular to the direction R of the source of radiation.

Figure 5:
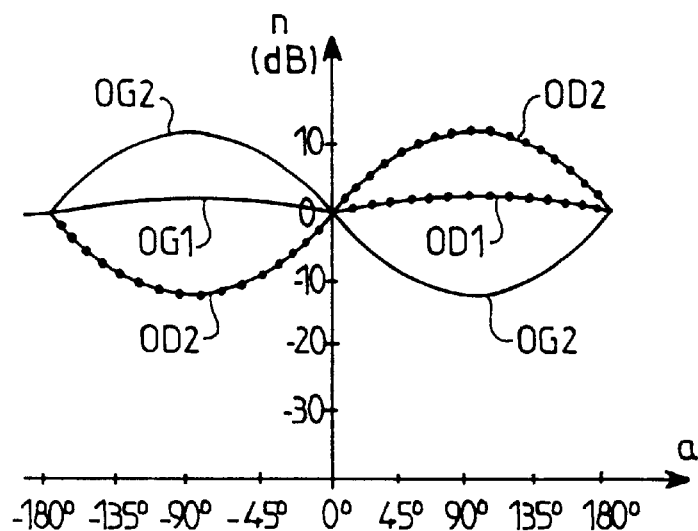
FIG. 5 is a diagram illustrating the variation of the amplitude of the sound signals in the left and right earphones as a function of their angular deviation, in a normal mode and in a rallying mode.

FIG. 5 illustrates the variation of the amplitude of the sound signal applied to each of the ears, in the case of the two different operational modes, namely a normal mode and a rallying mode in which the sensitivity of the apparatus is increased in the vicinity of the angular deviation of 0°. The simple-line curves correspond to the left ear while the curves bearing a succession of black dots correspond to the right ear. In normal mode, the level of the sound signals applied to the left and right ears follows the respective curves OG1 and OD1 upon a variation of the angular deviation a. In the rallying mode, each of the audio signal processing circuits 6d, 6g is connected to a means producing a control signal of rallying mode r (FIG. 2) in order to increase the inclination of the curves, i.e. the sensitivity of the apparatus, at the point of zero intersection on the ordinate scale corresponding to the sound level n in decibels. It is seen in FIG. 5 that in the rallying mode the curves OG2 and OD2 are clearly more pronounced and spaced apart and that they are translated by much more distinct sound signal levels between the ear exposed to the radiation and the opposite ear, as soon as the angular deviation a moves away from the value 0°.

The apparatus of which the diagram is shown in FIG. 2 also makes it possible to locate a source of a radiation with non-modulated carrier wave. In this case, a low-frequency signal generator 8 is used which may be connected, by means of a switch 9, to the two audio signal processing circuits 6d, 6g in place of the receiver 4. This low-frequency signal generator 8 then applies to the two circuits 6d, 6g its own low-frequency signal in place of the low-frequency signal resulting from demodulation, by the receiver-demodulator circuit 4, of the carrier wave, as in the case described hereinbefore. The switch 9 thus connects to the audio signal processing circuits 6d, 6g either the receiver-demodulator 4 when the carrier wave is modulated, or the low-frequency generator 8 when the carrier wave is not modulated.

Figure 6:
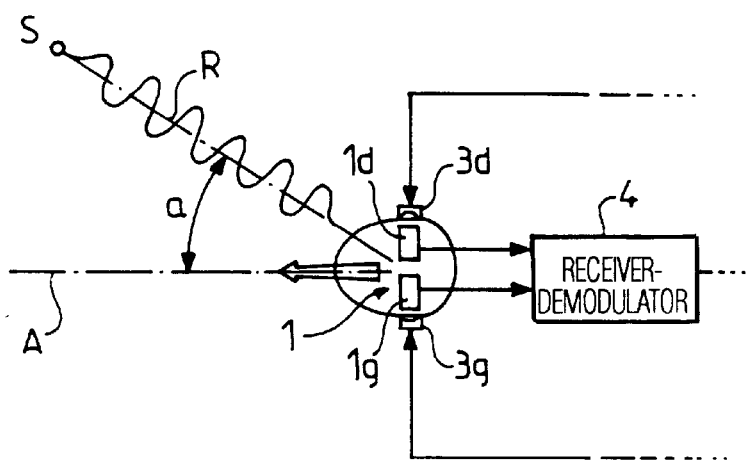
FIG. 6 is a block diagram of a variant of the apparatus in which analysis of the origin of the radiation is effected by interferometry.

FIG. 6 is a partial diagram of a variant embodiment in which analysis of the origin of the radiation is obtained by interferometry. In this case, the antenna system 1 comprises two distinct sensors 1g and 1d, connected separately to the receiver-demodulator 4, to detect the phase shift of the carrier wave of the radiation on the two antenna elements 1g, 1d as a function of the angular deviation a.

FIG. 7 illustrates an application of the direction-finding apparatus according to the present invention to the creation of a virtual interactive sound environment. In this case, the direction-finding information is used to make a rotation of the sound panorama servo-controlled by the position of the listener's head. In that case, as in the preceding cases, the apparatus comprises the receiver-demodulator 4 and the signal processing circuit 5 which is connected to the antenna system 1 by the link 7 in order here to apply the modulating signal. However, the receiver-demodulator 4 comprises a plurality of channels, for example four in number (quadraphony) and it comprises four outputs corresponding respectively to these four channels and which are connected to an audio signal processor 12 connected to the two earphones 3d, 3g. The signal processing circuit 5 is also connected to the audio signal processor 12 in order to apply thereto the signal x characterizing the angular deviation a. The apparatus thus makes it possible to reconstitute, by means of the two earphones 3d, 3g, a sound environment varying as a function of the position of the head with respect to the direction of the source S, i.e. the angular deviation a, exactly in the same way as if the listener were placed in a sound environment with four acoustic sources, namely a front right-hand loudspeaker, a front left-hand loudspeaker, a rear right-hand loudspeaker and a rear left-hand loudspeaker.

Figure 8:
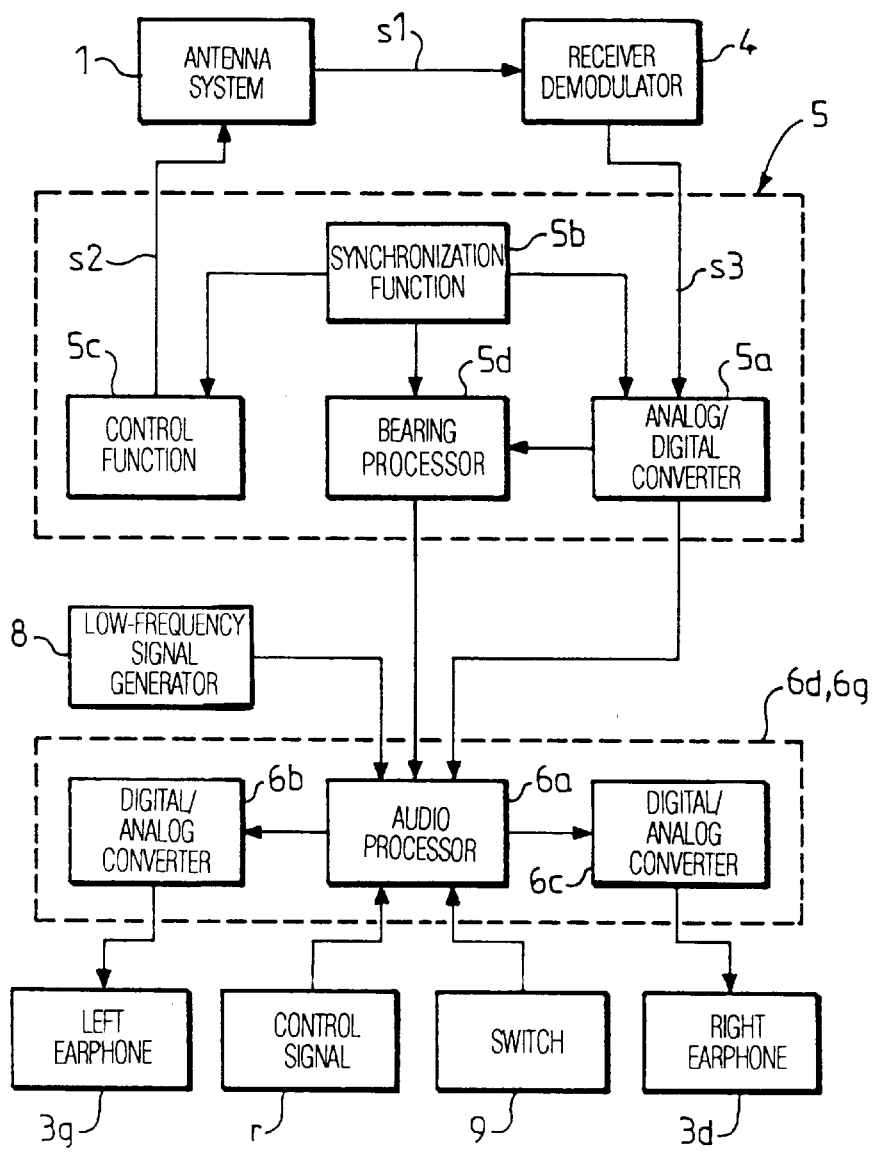
FIG. 8 is a diagram of a flowchart of the software for processing the direction-finding signal.

With reference to the flowchart of FIG. 8, software employed in a DSP (Digital Signal Processor) will now be described. FIG. 8 shows the sensor network 1 corresponding to the antenna system 1 of FIG. 2, which emits a composite signal s1 in the direction of the receiver or demodulator 4. The sensor network or the antenna system 1 receives a signal s2 for controlling the network or antenna system 1 from the signal processing circuit 5. This circuit 5 receives the audio signal s3 coming from the receiver or demodulator 4, which signal is subjected to an analog/digital conversion in a step 5a. The signal processing circuit 5 performs a function of synchronization 5b which intervenes on the control function 5c of the antenna system 1, the analog/digital conversion 5a and the bearing processing 5d. The result of the bearing processing 5d is applied to an audio processing step 6a of the audio signal processing circuits 6d, 6g on which the digital audio datum coming from the low-frequency signal generator 8 and the result of the analog/digital conversion 5a of the processing circuit 5 also intervene. The audio processing step 6a acts, via digital/analog conversion steps 6b, 6c, on the left earphone 3g and the right earphone 3d and a sensitivity selection (rallying mode control signal r of FIG. 2) and an inner/outer audio selection (switch 9) also act on the audio signal processing step 6a.

I claim:

1. Personal direction-finding apparatus for detecting an electromagnetic, infrared or ultrasound radiation emitted from a source, with a view to determining the direction of the source or creating a virtual sound environment, comprising:

a radiation sensing means worn on a user's head, adapted to be oriented with respect to the source by a rotational movement of the head, and producing a signal having a variable characteristic depending on the direction of the source with respect to the sensing means;

an earphone placed respectively over each of the user's two ears, and to which an audio signal is applied, to emit a sound signal whose nature depends on the angular deviation between the direction of the source and the current position of the user's head;

a receiver including a demodulator having an input connected to the sensing means and an output outputting a demodulated signal;

a circuit for processing the demodulated signal at the output of the demodulator;

said circuit outputting a control signal as a function of the angular deviation between the direction of the source and the current position of the sensing means;

two audio signal processing circuits, respectively allocated to right and left phonic voices, each audio signal processing circuit having an input connected to the processing circuit, and an output connected respectively to the right and left earphones, thereby allowing the direction of the source to be perceived by binaural listening;

wherein the circuit for processing the demodulated signal is connected to the sensing means via a link for applying to said sensing means a modulating signal which is then combined with the modulation of a carrier wave of the radiation so that the sensing means delivers a double-modulation signal to the receiver, which delivers at its output two superposed demodulated low-frequency signals, namely a first signal coming from modulation of the carrier wave and a second signal from the modulating signal applied to the sensing means, said first and second signals being applied to the audio signal processing circuits; and a low-frequency signal generator adapted to be connected by a switch, to the two audio signal processing circuits when the carrier wave of the radiation is not modulated.

2. Apparatus according to claim 1, wherein the sensing means comprise an antenna system having at least one analysis axis parallel to the transverse axis of the user's ears.

3. Apparatus according to claim 1, wherein each of the audio signal processing circuits is connected to a means for producing a rallying mode control signal in order to increase the sensitivity of the apparatus in the vicinity of the angular deviation of 0°.

4. Apparatus according to claim 2, used for creating a virtual interactive sound environment, wherein the receiver comprises a plurality of channels and a plurality of outputs connected to an audio signal processor connected to the two earphones, and wherein a direction-finding signal processing circuit connected to the antenna system for applying thereto a modulating signal is also connected to the audio signal processor to apply thereto the control signal characterizing the angular deviation, whereby a sound environment varying as a function of the position of the user's head with respect to the direction of the source is reconstituted by the two earphones exactly in the same manner as if the user were located in a sound environment with a plurality of acoustic sources.

* * * * *